Sept. 14, 1965    J. T. DICKINSON    3,205,608
WIGGLING ACTION FISHING LURES
Filed Dec. 4, 1963    2 Sheets-Sheet 2
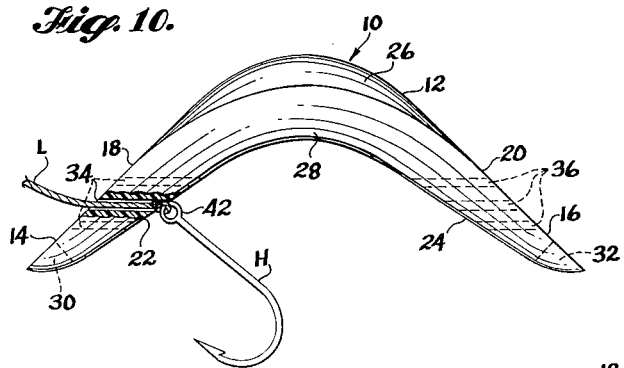
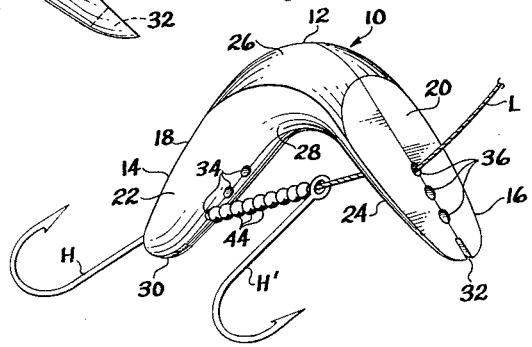
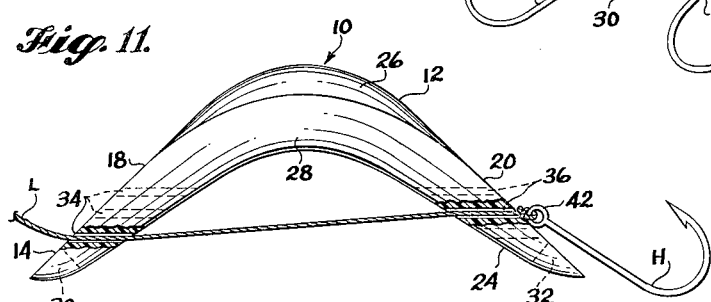
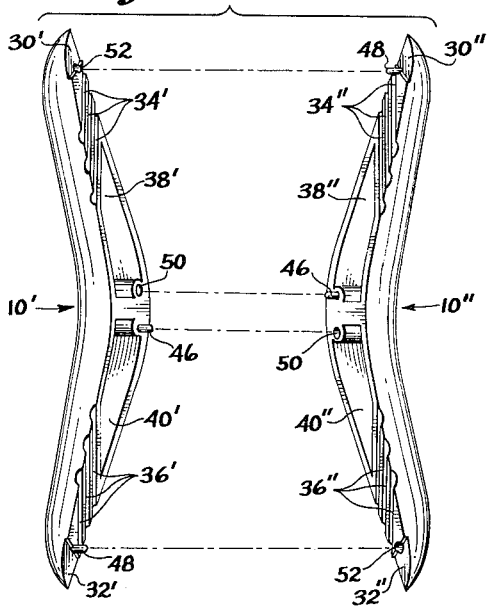
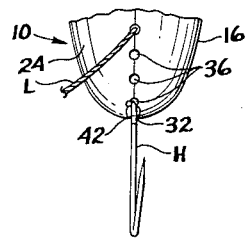
INVENTOR.
JOHN T. DICKINSON
BY Mathis & Graybeal
ATTORNEYS

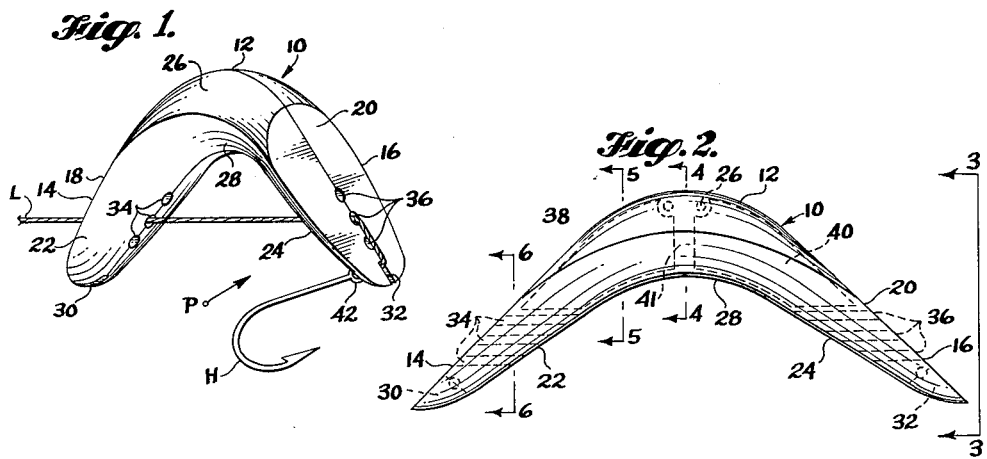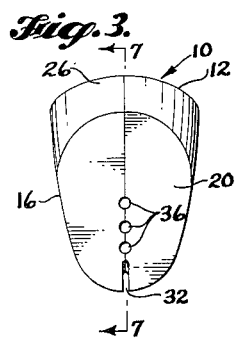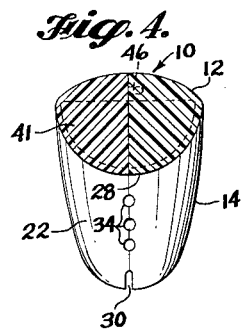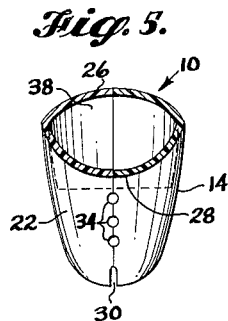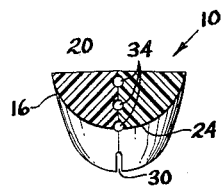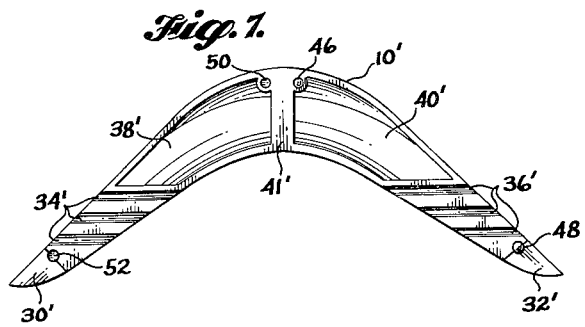

3,205,608
WIGGLING ACTION FISHING LURES
John T. Dickinson, 16240 38th Ave. NE., Seattle, Wash.
Filed Dec. 4, 1963, Ser. No. 327,937
11 Claims. (Cl. 43—42.23)

This application is a continuation-in-part of my co-pending application Serial No. 184,345, filed April 2, 1962, entitled Fishing Lures, and now abandoned.

The present invention relates to artificial fishing lures, and more particularly to artificial fishing lures of the "wiggling action" type.

It is the angler's desire to be able to use a lure which is considered most likely to attract fish into striking under the then-apparent conditions. Hence, it is common practice to have a tackle box containing a number of lures of various sizes and which have various types of accessories. Similarly, it may be desired to change lures on the basis of the particular action they effect when in the water, considering conditions existing, such as fast or slow, clear, etc. Furthermore, lures may have to be changed depending on whether the lure is to be trolled beneath or above the fish. It therefore becomes an object of this invention to provide a fishing lure that is many lures in one. The lure of the present invention is especially adapted to provide a choice in the arrangement of the same onto a fishing line and in relation to one or more fishing hooks attached to such line, with each arrangement involving the obtainment of a different action or effect of the lure in the water.

Another object of the present invention is to provide a lure that does not involve the common lure accessories heretofore considered necessary to make the lure a functional unit. Thus, such accessories as diving lips, line and hook catches, hardware to which the fishing line or leader is to be attached, screw eyes and other contrivances, are not a part of the lure of the present invention. The accessories attached to conventional lures cause great inconvenience and trouble in that it is difficult to keep them in good condition because of the rusting of attached metal parts and also because of the necessity for cleaning and polishing. Also, the hooks attached to conventional lures present problems in handling which in some cases necessitates that each such lure be separately boxed or enclosed. Owing to the unique construction of the lure of the present invention, involving no hook as a permanent part thereof, it is possible for the fisherman to carry a number of such lures loose in his pocket if he wishes without any danger of hooking himself or his clothing.

Still another object of the invention is to provide a hookless lure that is adapted to be threaded onto a line to which a hook is attached. The construction of my lure is such that the hook may be placed relatively either above or below the lure and may be changed from one such position to the other without having to remove the lure from the line.

A further object of the present invention is to provide a reversible fishing lure of the wiggling action type comprising a longitudinally arcuate body member having a rounded midportion and two end portions extending outwardly in opposite directions from said midportion. Each end portion preferably has a slotted tip part providing a selectively usable, line receiving slot. Also, a group of selectively usable, line receiving passageways extend through the end portions of the lure at locations spaced progressively inwardly from the line receiving slots. The line is attached to the lure by selectively threading the line through one or more of the line receiving openings. A hook attached to the end of the line prevents the lure from sliding rearwardly off of the line.

Yet another object of this invention is to provide a lure that is symmetrically constructed about a longitudinal plane of symmetry and comprises a pair of identical, longitudinal half sections, with each half section having inner surface portions abutting inner surface portions of the other half sections in the longitudinal plane of symmetry. Each half section also comprises a plurality of detent or pin means formed on, and a plurality of detent or pin receiving openings formed in, its inner surface portions. The detents of each half section extend into the detent receiving openings in the other half section, providing for outer surface alignment of the half sections. A plurality of grooves are formed in the inner surface portions of the half sections. When the line is assembled, the grooves in each half section register with the grooves in the other half section to form the line receiving passageways. The half sections also include inner, offset surface portions, at the ends thereof, forming when the lure is assembled the slotted end parts. In addition, the half sections are preferably formed to include relatable inner cavities, which when the lure half sections are joined together form air cells functioning to buoy the lure in the water in a position wherein the midportion thereof is disposed generally upwardly and the end portions thereof extend generally downwardly.

Another object of this invention is to supply a fishing lure in which the hook may pull free of the lure when a fish is caught or when the hook becomes caught upon some snag or other underwater object.

Still another object is to furnish a lure which closely abuts the hook as the lure is moving through the water.

Yet another object of this invention is to provide a lure which is reversible thus allowing either end to be used in the forward direction.

A still further object of this invention is to provide a lure in which both ends may be retained on the line or leader.

These and other objects, features, characteristics and advantages pertaining to and inherent in the present invention will be apparent from the following description of certain typical and therefore non-limitive embodiments thereof, as illustrated in the accompanying sheets of drawing, wherein like numerals refer to like parts, and wherein:

FIG. 1 is a perspective view looking toward one side and one end of the lure of the present invention in its preferred form, such view showing one manner of attaching the lure to the line or leader;

FIG. 2 is a side elevational view of the lure shown by FIG. 1, but detached from the line or leader, such view showing by hidden lines the generally coaxial relationship of the line receiving passageways that extend through the end portions of the lure, and also showing by hidden lines the outlines of internal air cells or chambers tending to buoy the lure in the water in the position illustrated;

FIG. 3 is an end elevational view of the lure taken substantially along line 3—3 of FIG. 2;

FIG. 4 is a transverse sectional view taken through the lure at the transverse plane of symmetry, substantially along line 4—4 of FIG. 2;

FIG. 5 is a transverse sectional view of the lure taken through the lure at an air cell substantially along line 5—5 of FIG. 2;

FIG. 6 is a transverse sectional view taken through an end portion of the lure substantially along line 6—6 of FIG. 2, and showing the relative alignment and spacing of the line receiving passageways that extend through an end portion of the lure, and also showing the line receiving slot at the tip of the lure;

FIG. 7 is a side elevational view of a longitudinal half section of the lure taken along line 7—7 of FIG. 3, looking toward the inner side thereof, and showing the internal construction and configuration of such half section, which is identical to that of the other half section;

FIG. 8 is an exploded perspective view of two related, identical half sections prior to their assembly;

FIG. 9 is a fragmented view of the rearward end portion of the lure shown in FIG. 1, such view being taken substantially from the aspect denoted point P in FIG. 1, looking in the direction indicated by the arrow, with the line or leader being shown in a slackened condition and leading off to one side for clarity of illustration;

FIG. 10 is a side elevational view of the lure showing a different manner of attaching the same onto the line, involving the use of a single hook disposed between the two end portions of the lure and arranged to abut the trailing side of the forward end portion as the assembly is pulled through the water by the line;

FIG. 11 is a side elevational view of still another way of attaching the lure to the line, involving the used of a single hook, disposed rearwardly of the rearward end portion of the lure, with the line or leader extending forwardly from the eye of such hook, through a line receiving passageway in the rearward end portion, then spanning in chord fashion the space between end portions, next extending through a line receiving opening in the forward end portion; and then extending forwardly of the lure; and FIG. 12 is a perspective view looking toward the end of the forward end and one side of the lure, and showing still another manner of attaching the lure to the line, such arrangement involving the use of two hooks, one arranged rearwardly of the lure in the same manner as shown in FIG. 11, and the second hook disposed below the midportion of the lure and between the two end portions thereof, with a plurality of beads shown threaded on the line or leader between the second hook and the rearward end portion of the lure.

In preferred form the fishing lure of the present invention comprises a longitudinally arcuate body member 10, symmetrically constructed about longitudinal and transverse planes of symmetry.

In FIG. 1 the lure or body member 10 is shown attached to a fishing line L generally above a hook H secured to the end of such line L. Herein the term "line" is used to denote any of the various types of line or leader that are commonly used, or may be used, in the vicinity of the hook or hooks.

Body member 10 preferably has a rounded midportion 12 and two tapering end portions 14, 16, respectively, extending longitudinally in opposite directions from said midportion 12. Preferably, the end portions 14, 16 possess substantially flat upper surfaces 18, 20, each being generally dihedrally related to the other. The lower or under surfaces 22, 24 of end portions 14, 16 are preferably of convex character. Preferably, both the upper surface 26 and the lower surface 28 of midportion 12 are convex surfaces. The end portions 14, 16 possess slotted end parts presenting selectively usable line receiving slots 30, 32.

According to the invention a plurality of selectively usable, line receiving passageways 34, 36 extend through each end portion at locations spaced progressively inwardly from the line receiving slots 30, 32. By way of typical and therefore non-limitive example, three line receiving passageways 34 are shown extending through end portion 14 and to be generally coaxially related with three similar line receiving passageways 36 extending through the opposite end portion 16. Also by way of typical and therefore non-limitive example, the line receiving passageways 34, 36 are illustrated as extending generally parallel to each other in the longitudinal plane of symmetry and generally perpendicular to the transverse plane of symmetry.

As previously mentioned, lure 10 is of the "wiggling action" type. Owing to its arcuate configuration and relative position in the water, when lure 10 is pulled through the water by the fishing line L it moves sideways in a zigzag pattern, darting to the left and then to the right, and also rolls or oscillates sideways. Together such "darting" and "rolling" movements constitute what may be termed a "wiggling action."

The flat surfaces 18, 20 enhance the wiggling action of lure 10 in the water. Such action is also effected by the manner in which lure 10 is attached to the fishing line L. Owing to the unique construction of lure 10, its action in the water may be easily changed by merely relocating the fishing line L in the selectively usable passageways 34, 36. Of course, the lesser the offset of lure midportion 12 from the fishing line L, the more active is the lure 10 in the water. Therefore, it follows that as the fishing line L is moved progressively inwardly from one pair of line receiving passageways 34, 36, for example, to the next, the action of the lure 10 in the water is enhanced. Conversely, movement of the line L from a relatively inboard location to a relatively outboard location in the passageways 34, 36 lessens the action of the lure. The line receiving slots 30, 32 provide additional alternative ways of attaching lure 10 onto the fishing line to change its effect, as will hereinafter be explained in more detail.

Preferably lure 10 is formed of a suitable molded plastic material, such as a synthetic resin or the like, for example. As perhaps best illustrated by FIGS. 2, 5, 7 and 8, the lure 10 is constructed to include interior air cell means located between the two groups of line receiving passageways 34, 36, respectively. In the preferred form of the invention, illustrated by the drawing, the air cell means consist of a pair of air cells 38, 40, disposed on opposite sides of the transverse plane of symmetry and separated by a partition 41. The remaining portions of lure 10 through which line receiving passageways 34, 36 and line receiving slots 30, 32 extend, are preferably of solid construction. The relatively central and upper location of the air cells 38, 40, tends to buoy lure 10 into substantially the position illustrated in FIG. 2, when in the water. In other words, the air cells 38, 40 tend to buoy the lure 10 to a position in the water wherein the midportion 12 thereof is disposed generally upwardly and the end portions 14, 16 thereof extend generally downwardly.

Several of the various ways that lure 10 may be arranged on line L relative to hook H will now be described. In FIGS. 1 and 9, a hook H, suitably secured to the end of line L, is shown disposed between the end portions 14, 16 of lure 10. The line L is engaged by slot 32 and the eye portion 42 of hook H abuts the lower surface 24 in the region thereof immediately surrounding slot 32. Line L extends from eye 42 rearwardly of the lure 10 and through slot 32. Next it changes direction and extends forwardly through one of the line receiving passageways 36 in end portion 16. Line L then spans in chord fashion the space between the end portions 14, 16. Next line L extends through one of the line receiving passageways 34 in end portion 14, and then extends forwardly of the lure and through the water to the line to the fishing rod, etc. (not shown). In the arrangement of FIGS. 1 and 9 the hook H is disposed generally below the lure 10 and opens generally rearwardly. Also both end portions 14, 16 are retained on the line L. As will be apparent, the particular selected line receiving passageways 34, 36 employed may be varied in accordance with the lure action desired.

Referring now to the arrangement of FIG. 10, the hook H is shown disposed between the end portions 14, 16, but this time the hook opens generally forwardly. The line L is suitably attached to eye 42 of hook H and extends forwardly from eye 42 and through one of the line receiving passageways 34 provided in end portion 14, which is the forward end portion in the arrangement illustrated. In this arrangement only the forward end portion of lure 10 is retained on the fishing line L. As will be apparent, the lure 10 closely abuts the hook H as the lure is pulled through the water by line L.

In the arrangement of FIG. 11, the hook H is disposed generally above the bottom and to the rear of the lure 10. The line L is shown extending from the hook eye 42, through a selected one of the line receiving passageways 36 in the rearward end portion 16, then spanning in chord fashion the space between the end portions 14, 16. Next line L extends through a selected one of the line receiving passageways 34 in the forward end portion 14, and then extends forwardly of the lure 10. The hook H may be changed from the position illustrated in FIG. 11 to the position illustrated in FIGS. 1 and 9 by simply sliding lure 10 forwardly on line L a slight amount and then drawing the portion of line L situated immediately adjacent hook eye 42 into engagement in slot 32. As is apparent, the reverse of this procedure involving the movement of the hook H from a position below the lure and between the end portions 14, 16 thereof, as illustrated in FIGS. 1 and 9, to a position generally above the bottom and to the rear of the lure, as illustrated in FIG. 11, is just as easily effected.

In the arrangement of FIG. 11 the line L is shown extending through the lowermost line receiving passageway 34 and through the middle line receiving passageway 36. This lessens the angle of attack of surface 18 and of course affects the action of lure 10 in the water. In addition a greater part of rearward end portion of the lure extends below line L and this also affects lure action. Also any one of the line receiving passageways 34 may be used alone on a line L in a manner following FIG. 10 or in combination with any one of the line receiving passageways 36 in a manner following FIG. 1 or 11 or 12.

In the arrangement illustrated by FIG. 12, end portion 16, which is the rearward end portion in the arrangements of FIGS. 1 and 9–11, is forwardly disposed, showing the reversibility of lure 10. In FIG. 12, the hook H is depicted in substantially the same position that it occupies in the arrangement in FIG. 11. However, the line L is shown as extending forwardly from hook H through the lowermost passageway 34 in end portion 14, then spanning in chord fashion the space between the two end portions 14, 16, next extending through the uppermost passageway 36 in end portion 16, and then extending forwardly of the lure 10. Thus, in this arrangement, it is the forward end portion that extends the greater amount below line L and end surface 20 has a relatively flatter angle of attack. Also, in the arrangement of FIG. 12, a second hook H', disposed between the end portions 14, 16, is shown threaded onto that portion of the fishing line L that extends in chord fashion between the end of portions 14, 16. Spacer means, as a plurality of red-colored beads or the like, some of which are designated 44, may also be threaded on the line L, between hook H' and end portion 14, so as to keep the hooks H, H' spaced sufficiently apart to prevent their interfering with each other.

Of course, the arrangements described in connection with FIGS. 1 and 9–12 are merely illustrative of a few of the many possible arrangements of lure 10 onto the fishing line L and relative to the hook H (or hooks) that are possible owing to the unique construction of the lure 10 presented by this invention.

In preferred form lure 10 is constructed from a pair of complementary longitudinal half sections, designated 10', 10'' in the drawing. Each half section 10', 10'' includes inner surface portions that, when the lure is assembled, abut the inner surface portions of the other half section in the longitudinal plane of symmetry. The lure half sections 10', 10'' also include a plurality of detent or pin means formed on, and a plurality of detent or pin receiving openings formed in, their inner surface portions, as illustrated in FIGS. 7 and 8, for example. In the embodiment illustrated, a pair of detents 46, 48 are shown located to one side of the transverse plane of symmetry of each lure half section 10', 10''. Detent 46 is located closely adjacent the transverse plane of symmetry, and detent 48 is disposed distal the transverse plane of symmetry closely adjacent a tip of the half section. The detent receiving openings 50, 52 are spaced at substantially, the same distance away from the transverse plane of symmetry, but on the opposite side thereof. As best shown by FIG. 8, lure half section 10'' is identical to lure half section 10' and when in use, it is reversed end-for-end and related to half section 10' in the manner illustrated. Thus the detents 46, 48 formed thereon register with the detent receiving openings 50, 52 formed in lure half section 10'.

Similarly, the detents 46, 48 formed on lure half section 10' register with the detent receiving openings 50, 52 formed in lure half section 10''. To assemble the lure 10, the lure half sections 10', 10'' are moved relatively together until the detents 46, 48 extend into the corresponding detent receiving openings 50, 52, providing outer surface alignment of the lure half sections 10', 10'', and the inner surface portions of such half sections 10', 10'' abut. By having the lure half section 10' identical with the lure half section 10'', they are both manufactured from a common mold and with a minimum cost. If the said sections were paired, instead of being identical, two molds would be required in the manufacture. Also, the lure made from two identical halves is completely reversible in direction of use. Also, the sameness of a forward and a trailing end of the lure provides for fineness of adjustment of the action of the lure in water by utilizing of selected openings 34 and 36 in threading of a line therethrough.

The two sections 10' and 10'' are secured together to complete the lure. To accomplish this, a suitable cement may be applied to the inner surface portions before the half sections 10', 10'' are pressed together or, in the alternative, the assembled lure may be dipped into a suitable solvent (e.g. when the half sections are molded from a butyrate then such a solvent may be a methyl ethyl ketone) so as to cause the fusing together of the two lure half sections 10', 10''.

A desirable plastic which may be employed in molding the half sections 10' and 10'' is cellulose acetate butyrate (commonly referred to as butyrate) as it is suitable for molding and has the desired strength and weight characteristics. Such plastic is set forth by way of illustration and not as a limitation. Some of the U.S. trade names for such a butyrate are Tenite, Lumarite, Nixon CA, Plasticele, Chemaco, Fibestos, etc. Common solvents for butyrate are acetone, methyl acetate, ethyl acetate, methyl ethyl ketone and many others.

The lure half sections 10', 10'' (see FIGS. 7 and 8) are internally configured in a manner providing internal cavities 38', 38'', 40', 40'', which form the air cells 38, 40 when lure 10 is assembled and the longitudinal seam is sealed. The inner surface portions of lure half sections 10', 10'' are also grooved, the grooves being designated 34', 34'', 36', 36'' in FIGS. 7 and 8. When the lure 10 is assembled, the grooves 34', match up with the grooves 34'' to form the line receiving passageways 34, and the grooves 36' register with the grooves 36'' to form the line receiving passageways 36. At the tips of the half sections 10', 10'', the inner surfaces are inset at 30', 30'', 32', 32'', forming half portions of the line receiving slots 30, 32. Thus, when lure half sections 10', 10'' are assembled together to form the lure 10, the inset surfaces 30', 30'' form the slot 30, and the inset surfaces 32', 32'' form the slot 32.

Preferably an injection mold is used in the manufacture of lure half sections 10', 10''. Owing to the identity of lure half sections 10', 10'' and the judicious location of detents 46, 48 and detent openings 50, 52, the same mold can be used for both.

According to the invention, the size of lure 10 may vary from small to quite large. The color may vary and the body may be completely opaque, transparent or translucent. Also, the surfaces 18, 20 may be reformed in various manners after lure 10 is assembled, such as making one or both of them slightly concave, for the purpose of varying lure action.

From the foregoing, various further modifications, arrangements and adaptations of the present invention will occur to those skilled in the art to which the invention is addressed, within the scope of the following claims.

What is claimed is:

1. A fishing lure comprising a longitudinally arcuate body member having a rounded midportion and two tapering end portions extending outwardly in opposite directions from said midportion, each end portion having an outwardly extending open ended slotted tip part providing a selectively usable, line receiving slot, and a group of selectively usable, line receiving passageways extending through each end portion of the lure at locations spaced progressively inwardly from the line receiving slots.

2. A fishing lure according to claim 1, said lure including an internal hollow space located between said groups of selectively usable, line receiving passageways, said hollow space functioning to buoy the lure into a position in water wherein the midportion thereof is disposed generally upwardly and the end portions thereof extend generally downwardly.

3. A fishing lure symmetrically constructed about a longitudinal plane of symmetry, said lure comprising a pair of identical, longitudinal half sections, each being symmetrically constructed about a transverse plane of symmetry, each said half section having inner surface portions abutting inner surface portions of the other half section in the longitudinal plane of symmetry, said half sections together forming a longitudinally arcuate body member having a rounded midportion and two tapering end portions extending outwardly in opposite directions from said midportion, each half section also comprising a plurality of identical detent means formed on and a plurality of identical detent receiving openings formed in its inner surface portions, with the detents of each half section extending into the detent receiving openings in the other half section, providing outer surface alignment of said half sections, said fishing lure further including means for attaching the same to a fishing line.

4. A fishing lure according to claim 3, wherein a plurality of grooves are formed in the inner surface portions of each half section, with the grooves in each half section registering with the grooves in the other half section to form a plurality of selectively usable, line receiving passageways extending through the end portions of said body member and constituting the means for attaching the lure to a fishing line.

5. A fishing lure according to claim 4, wherein each end portion of the body member includes a slotted end portion defined by matching inset inner surface portions of said half sections.

6. A fishing lure according to claim 4, wherein said half sections include centrally disposed, relatable inner cavities, and said cavities together form air cells functioning to buoy the lure into a position in water wherein the midportion thereof is disposed generally upwardly and the end portions thereof extend generally downwardly.

7. A fishing lure symmetrically constructed about a longitudinal plane of symmetry, said lure comprising a pair of identical, longitudinal half sections, each being identical and symmetrically constructed about a transverse plane of symmetry, each said half section having inner surface portions abutting inner surface portions of the other half section in the longitudinal plane of symmetry, each half section also comprising a plurality of identical detent means formed on, and a plurality of identical detent receiving openings formed in, its inner surface portions, with the detents of each half section extending into the detent receiving openings in the other half section, providing outer surface alignment of said half sections, said fishing lure further including means for attaching the same to a fishing line.

8. A fishing lure according to claim 7, wherein at least one groove is formed in an inner surface portion of each half section, with such groove in each half section registering with the groove in the other half section to form a line receiving passageway, constituting the means for attaching the lure to a fishing line.

9. A fishing lure of the wiggling action type comprising a longitudinally arcuate body member comprising a pair of identical halves each symmetrically constructed about both longitudinal and transverse planes of symmetry, said body member having a rounded midportion and two tapering end portions extending outwardly in opposite directions from said midportion, each end portion having a slotted tip part providing a selectively usable, line receiving slot, a flat upper surface, and a convex lower surface, and said midportion having convex upper and lower surfaces, and a plurality of selectively usable, line receiving passageways extending through each end portion of the line at locations spaced progressively inwardly from the line receiving slots, said line receiving slots and openings providing a choice of ways of arranging the line on the line for the purpose of changing the action of the lure in the water.

10. A fishing lure according to claim 9, wherein said body member comprises a pair of identical, longitudinal half sections, each half section having inner surface portions abutting inner surface portions of the other half section in the longitudinal plane of symmetry, each half section also comprising a plurality of detent means formed on and a plurality of detent receiving openings formed in its inner surface portions, with the detents of each half section extending into the detent receiving openings in the other half section, providing outer surface alignment of said half sections, and wherein a plurality of grooves are formed in the inner surface portions of each half section, with the grooves of each half section registering with the grooves in the other half section to form the selectively usable, line receiving passageways.

11. In combination with a fishing line, a fishing hook attached to the end of said line, and a fishing lure of the wiggling action type on said line above the hook, said lure comprising a longitudinally arcuate body member having a rounded midportion and tapering forward and rearward end portions extending outwardly in opposite directions from said midportion, and a plurality of selectively usable line receiving passageways extending through both said forward and rearward end portions of the lure, said rearward end portion of the lure including an open ended slotted tip part having an inner face, and the selectively usable, line receiving passageways in such rearward end portion are spaced progressively inwardly of the lure from said slotted tip part, said fishhook is disposed between the two end portions of the lure, in abutting engagement with the inner face of said slotted tip part, and said fishing line extends rearwardly from said fishing hook, through the slot in said slotted tip part, and then changes direction and extends forwardly through one of the selectively usable, line receiving passageways in said rearward end portion, then spans in chord fashion the space between said end portions, next extends through one of the selectively usable, line receiving passageways in the leading end portion of the lure, and then extends forwardly of the lure.

References Cited by the Examiner

UNITED STATES PATENTS

| | | | |
|---|---|---|---|
| 2,522,179 | 9/50 | Jensen et al. | 43—42.36 X |
| 2,752,721 | 7/56 | Denny | 43—42.35 X |
| 2,780,884 | 2/57 | Hadfield | 43—42.49 X |
| 2,933,846 | 4/60 | Garner | 43—42.35 |
| 3,096,597 | 7/63 | Dickinson | 43—42.05 |

ABRAHAM G. STONE, *Primary Examiner.*